US006499518B2

(12) United States Patent
Clemmons et al.

(10) Patent No.: US 6,499,518 B2
(45) Date of Patent: Dec. 31, 2002

(54) NONOVERFLOW, MAGNETIC FLOAT VALVE ASSEMBLY

(76) Inventors: Kody Clemmons, 815 Arkansas Ave., Lynn Haven, FL (US) 32444; Everett B. James, Jr., 2206 W. 11th St., Panama City, FL (US) 32401

( * ) Notice: Subject to any disclaimer, the term of this patent is extended or adjusted under 35 U.S.C. 154(b) by 0 days.

(21) Appl. No.: 10/072,514

(22) Filed: Feb. 11, 2002

(65) Prior Publication Data

US 2002/0074058 A1 Jun. 20, 2002

Related U.S. Application Data

(63) Continuation-in-part of application No. 09/737,693, filed on Dec. 18, 2000, now abandoned.

(51) Int. Cl.[7] ................................................. B65B 3/30
(52) U.S. Cl. ....................... 141/198; 141/216; 141/220; 141/229; 141/DIG. 1
(58) Field of Search ................................. 141/198, 206, 141/210–213, 216–218, 220–222, 227–229, DIG. 1

(56) References Cited

U.S. PATENT DOCUMENTS

| 4,360,038 A | * | 11/1982 | Trinkwalder, Jr. | .......... | 137/390 |
| 4,958,665 A | * | 9/1990 | Iwano | ........................ | 141/114 |
| 5,129,620 A | * | 7/1992 | Castetter | ..................... | 137/486 |
| 5,586,589 A | * | 12/1996 | Voelker | ....................... | 141/349 |

* cited by examiner

*Primary Examiner*—J. Casimer Jacyna
(74) *Attorney, Agent, or Firm*—William B. Noll

(57) ABSTRACT

A safety valve assembly for use with a portable container, such as for dispensing fuel to a vehicular gas tank, where the valve assembly features a pair of fluid sealing members to be manually activated to effect dispensing of the fluid from the container. A first of said sealing members includes a magnetizable float member that further functions to automatically shut-off the fluid dispensing procedure before the receiving receptacle overflows, thus avoiding a problem with unwanted spillage. The second sealing member is activated by applying pressure to the container against the receiving receptacle, whereby premature spillage is further avoided during transporation of the fluid filled container. Finally, a rotatable lock mechanism, in the form of a camming system, is provided.

15 Claims, 10 Drawing Sheets

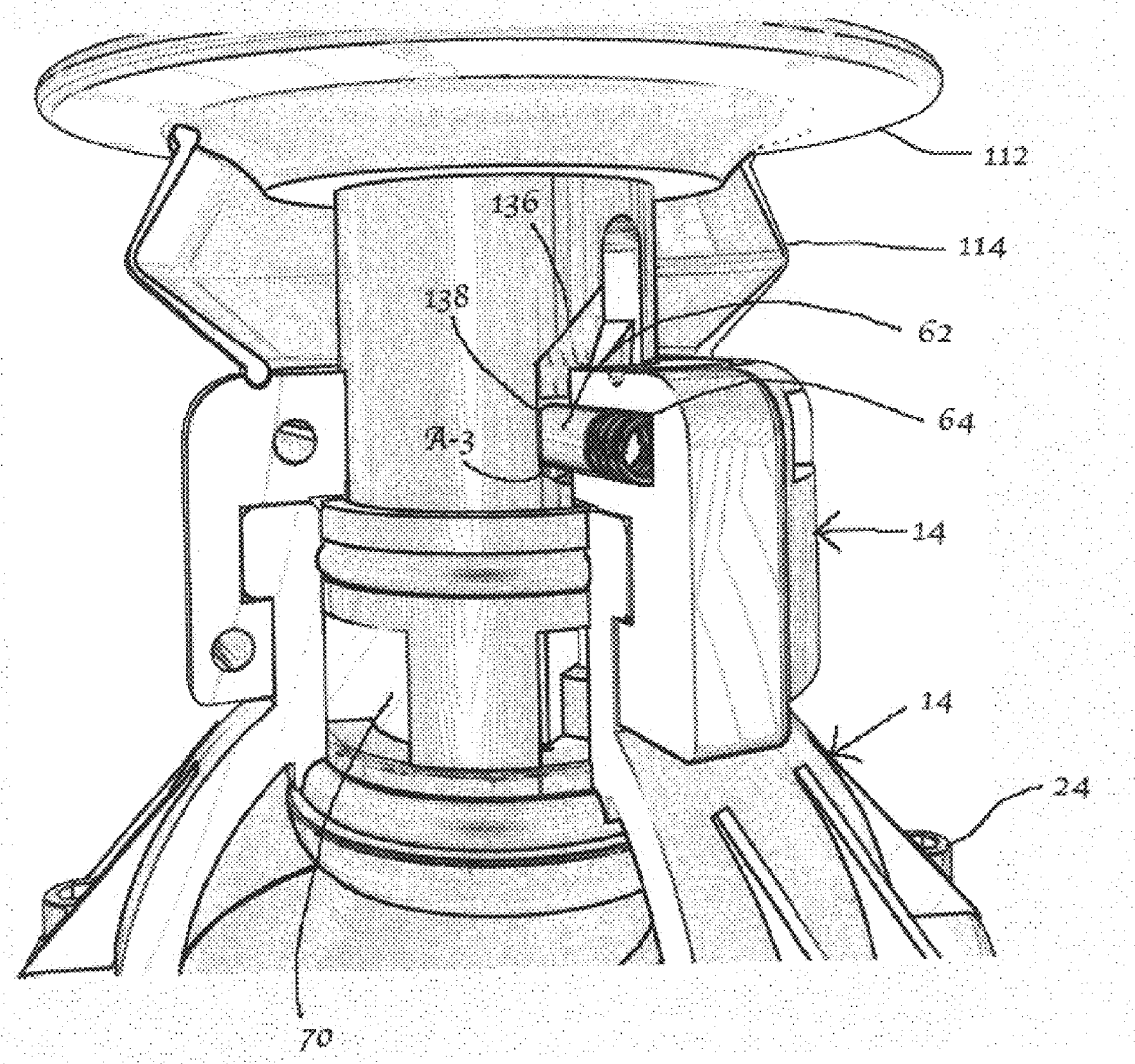

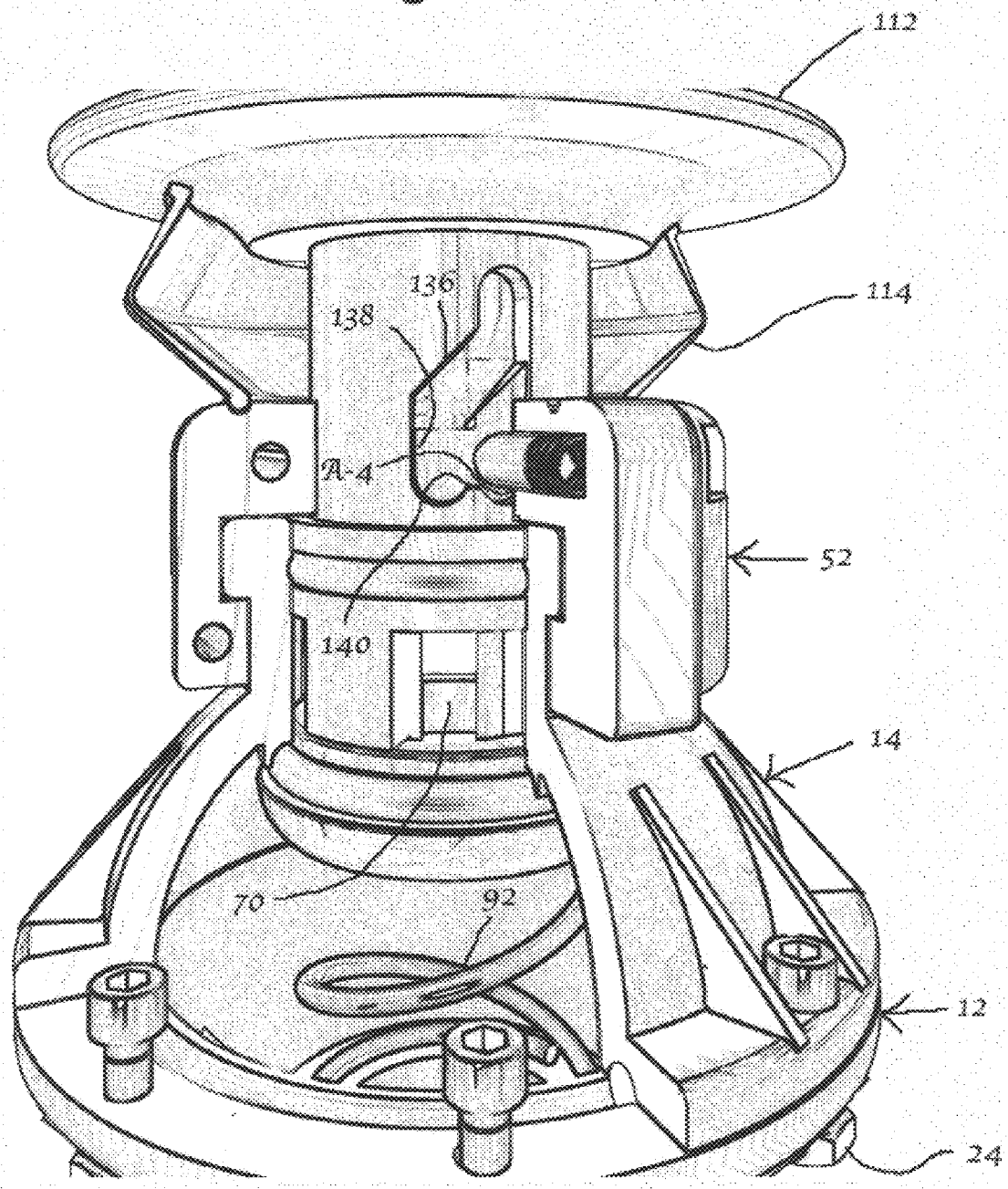

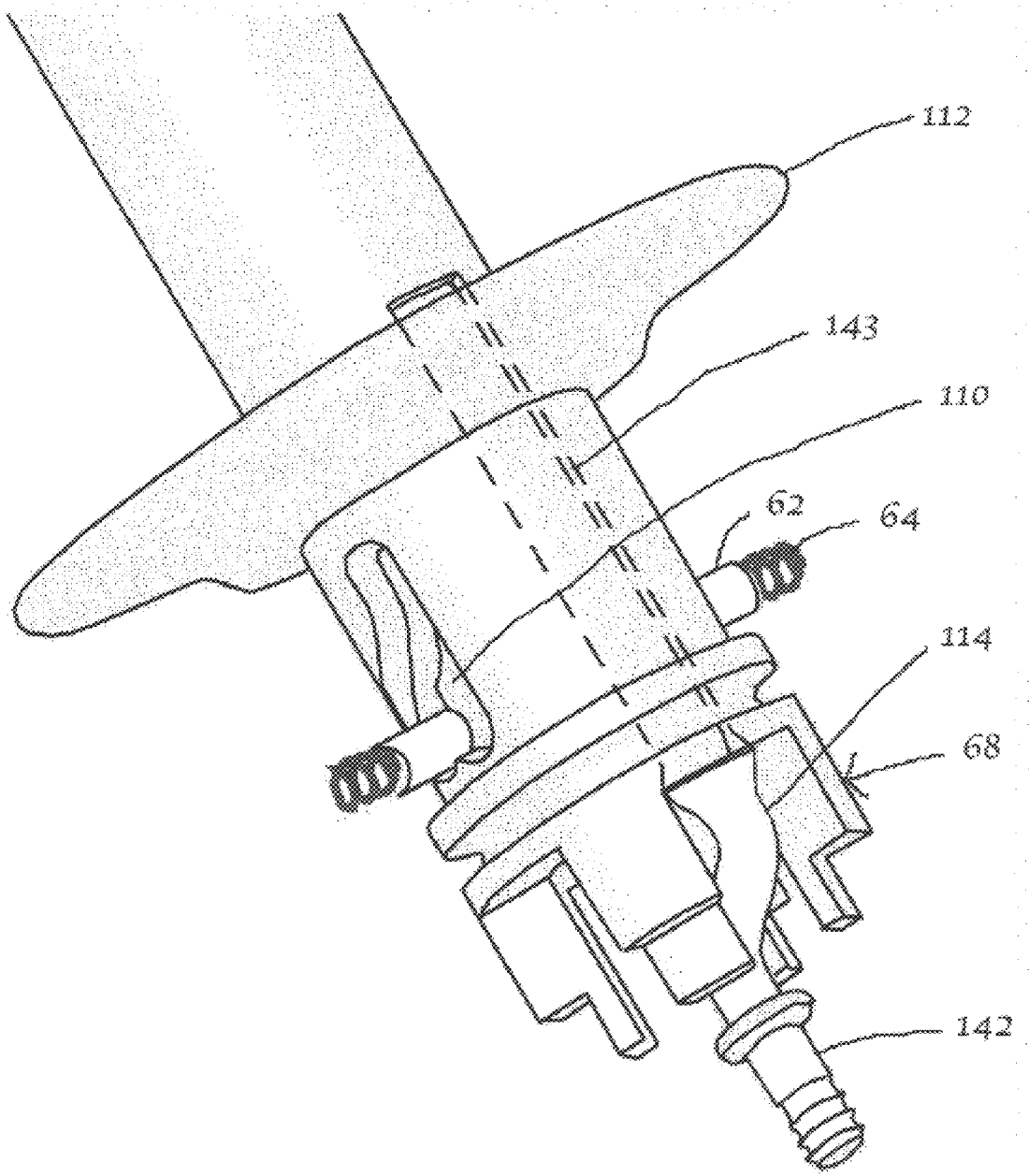

US 6,499,518 B2

NONOVERFLOW, MAGNETIC FLOAT VALVE ASSEMBLY

RELATED APPLICATION

The present application is a continuation-in-part of Ser. No. 09/737,693, filed Dec. 18, 2000, now abandoned under the title, "Fast Flowing Spring Loaded Valve Assembly", by the inventors hereof, where the contents thereof are incorporated herein in their entirety.

FIELD OF THE INVENTION

This invention is directed to the field of fluid dispensing containers, more particularly to a valve assembly for the dispensing container, where the valve assembly features a magnetic float to ensure against over filling of a receiving container.

BACKGROUND OF THE INVENTION

The present invention relates to a nonoverflow valve assembly that has particular utility in dispensing a liquid fuel, for example, from a portable container into the tank of a vehicle, such as an off road vehicle. The valve assembly includes an automatic shutoff of the fuel discharge by the use of a magnetizable float member that effects the automatic shut-off before reaching the overflow state. Additionally, the valve assembly incorporates a second sealing member that works in tandem with the magnetizable float member to effect the initiation of fluid flow and thus avoid any premature discharge of the fluid, i.e. fuel.

The need for safety, especially in avoiding spillage of liquid fuel onto a hot engine, has been recognized by the prior art with a number of systems. Often the solutions to make an effective transfer of fuel, for instance, were complex schemes. Some of these solutions are reflected in the following U.S. Patents:

U.S. Pat. No. 4,441,533, to Snyder et al., teaches an automatic fuel dispensing system including an automatic dispensing nozzle similar to dispensing nozzles which open manually to dispense liquids and shut-off automatically when tanks such as locomotive fuel tanks near the point of being filled, or for closing an automatic shut-off valve when the dispensing valve is a substantial distance from the tank being filled. The automatic dispensing system is provided with an atmospheric pressure balanced diaphragm and an internal vacuum conduit where the diaphragm operates the shut-off valve reduced air pressure from the vacuum conduit interrupts the pressure balance of the diaphragm. The tank to be filled is provided with an air conduit connected to the internal vacuum conduit of the automatic dispensing nozzle to operate the cut-off of the nozzle to a point adjacent the outer opening of the tank fill pipe when fuel enters the air conduit. Mounted in the fill pipe of the tank is a fill pipe adapter which cooperates with the nozzle spout of the automatic dispensing nozzle to create a vacuum chamber between the inserted nozzle spout and the adapter wall. To satisfy the vacuum demand of the automatic shut-off valve, the nozzle spout extends into the fill pipe adapter a sufficient distance to provide a narrow opening between the end of the spout and the adapter wall such that when liquid is dispensed from the nozzle spout, air is removed from the vacuum chamber creating a partial vacuum for operating the shut-off valve.

b.) U.S. Pat. No. 5,343,738, to Skaggs, relates to a double walled hose assembly including an elongate inner hose and an elongate outer hose enclosing the inner hose. Both the inner and outer hoses are flexible and made of a resilient material. The inner hose includes a fluid resistant inner layer, a tie layer encircling the inner layer and a reinforcing braid layer encircling the tie layer. An outer layer encircles the tie layer and the reinforcing braid such that the reinforcing braid is embedded between the tie layer and the outer layer. The outer hose is also made from a resilient material such that the outer hose is flexible. At least one rib extends between the inner hose and the outer hose. The at least one rib is secured to at least one of the inner hose and the outer hose and is made from a resilient material such that the rib is flexible. In this way, the hose assembly can be bent as necessary. The hose serves as a fluid transfer hose in a piping system for conveying a fluid from an outlet port of a pump to an inlet port of an above-ground fluid dispenser. A sensor wire may be provided between the two hoses to sense the presence of a fluid such as a fuel.

c.) U.S. Pat. No. 5,609,192, to Anderson, et al.; is a fuel dispensing nozzle and a method utilizing that dispensing nozzle. The method comprises the steps of providing a sealing means effective to mate in a sealing relationship with a fuel tank inlet, the sealing means comprising a boot having an elastomeric sealing surface, a source of pressurized gas, a channel providing communication from the source of pressurized gas to outside of the boot wherein pressure on the elastomeric sealing surface restricts flow through the channel, and a means to block fuel flow through the fuel dispensing nozzle when a threshold pressure or greater exist at the source of gas supply, the threshold pressure indicative of a sealing relationship between the sealing surface of the boot and a fuel tank inlet, mating the sealing surface to the fuel tank inlet, and passing fuel into the fuel tank only when the pressure within the gas supply conduit exceeds the threshold pressure.

d.) U.S. Pat. No. 5,971,042, to Hartsell, Jr. teaches a fuel dispenser for a dispensing system having a receiver capable of receiving fueling parameters transmitted from the vehicle. The fueling parameters relate to information about tank size, ullage, maximum allowed fueling rates and maximum fueling rates as a function of ullage, among others. Based on these fueling parameters, the fuel dispenser controls the fueling operation to optimize fuel delivery and minimize fuel spillage. Control of the fueling operation may vary from simply adjusting the delivery rate to a maximum allowed by the vehicle to defining a fueling schedule for the entire fueling operation wherein the fueling schedule defines a fueling process which varies flow rates throughout the fueling operation as necessary to optimize fueling. Additionally, the dispenser may continuously adjust the maximum fueling rate throughout the fueling operation based upon a fueling parameter defining the maximum fueling rate as a function of ullage. The dispenser may also control the fueling operation based on fueling parameters received from the vehicle in combination with fueling regulations mandated by various regulatory bodies. In such embodiments, the dispenser may optimize the fueling operation while abiding by both vehicular and regulatory limitations, such as maximum allowable delivery rates and predefined average fuel rates for all or various portions of the fueling operation.

The avoidance of premature spillage and the automatic shut-off of fluid flow features of the valve assembly of this invention will become more apparent in the description which follows, particularly when read in conjunction with the accompany drawings.

SUMMARY OF THE INVENTION

This invention is directed to an effective valve assembly for use with a portable container of the type that may be used to dispense a quantity of fluid, such as liquid fuel, to the tank of a vehicle, especially for an off road vehicle where speed and safety of transfer is important. Since a primary feature of the valve assembly is its ability to automatically shut-off before exceeding the capacity of the vehicle tank, the quantity of fluid to be transferred is less than the capacity of the tank. The valve assembly of this invention is mounted on the fluid dispensing, portable container, where the fluid dispensing is operable only after the release of first and second fluid sealing members in the assembly. The valve assembly comprises a through housing having first and second openings, where a first opening includes means for securing the valve assembly to the dispensing container, and a second opening slidably mounting a generally hollow cylindrical member through which the dispensing fluid is discharged from the container. The hollow cylindrical member includes a circular cap mounting a first sealing ring member at a first end for cooperating with the through housing to effect a fluid seal therebetween. A second sealing member disposed in proximity to the first sealing ring member, and includes an axially movable float member within the cylindrical member. The float member at a first end extends through the cylindrical member and mounts a disk member, while a second end mounts a magnetizable member for cooperating with the second sealing member to effect a fluid seal therebetween. The valve assembly is rendered operable by manually moving the float member by the application of force to the disk member to disengage the magnetizable member from the second sealing member. Thereafter, by the application of axial pressure against the cylindrical member to disengage the first sealing ring member from its engagement with the through housing, fluid may be dispensed into the receiving receptacle, i.e. tank.

Accordingly, a safety feature of this invention is the provision of a valve assembly, when used with a portable container for dispensing fuel, for example, that eliminates spillage in the transfer of fuel to a vehicle tank, where such spillage may result in severe damage or injury.

Another feature of the invention is a valve assembly that includes dual sealing members, both of which must be disengaged before dispensing of a fluid through the assembly may be accomplished.

Still a further feature hereof is the provision of a self contained floating, magnetizable fluid sealing member that automatically activates as the fluid level approaches the capacity of the receiving receptacle.

These and other objects of the invention will become more apparent in the specification which follows, especially when read by those skilled in the art.

BRIEF DESCRIPTION OF DRAWINGS

FIGS. 4 through 7, respectively, are perspective views, with parts removed of the valve assembly hereof, to show various rotative and locking positions to allow dispensing of the fluid only when dispensing is desired, where the several views are reversely oriented from those of FIGS. 1, 1A, 2, 2A and 3.

FIG. 8 is an enlarged, partial perspective view of the locked position of FIGS. 3 and 6, further showing details of the air return conduit.

DETAILED DESCRIPTION OF PREFERRED EMBODIMENT

Figure 1:
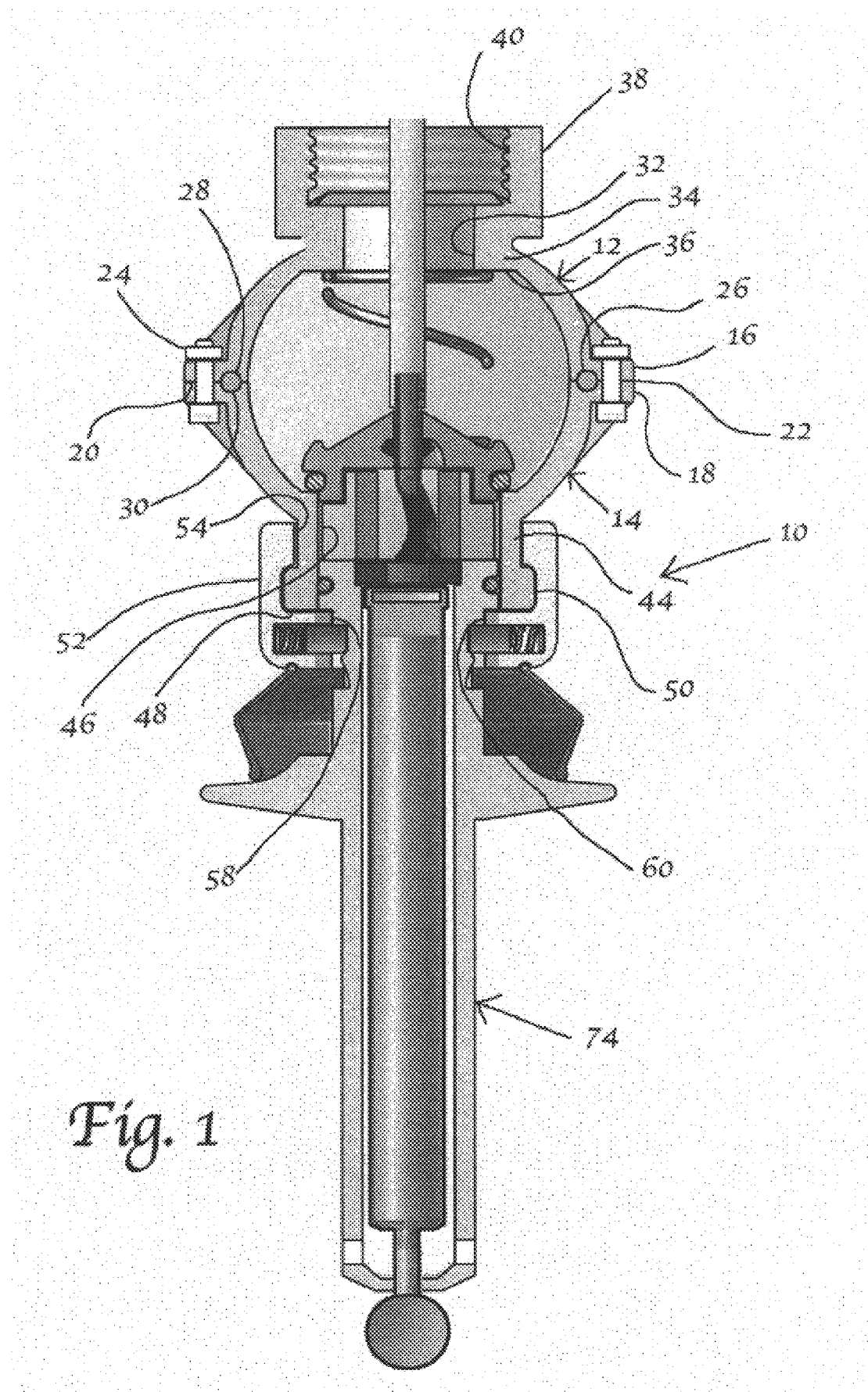
FIGS. 1, 1A, 2 and 2A are sectional views of the valve assembly according to the present invention, where the several views illustrate the operating positions of the dual, independently functioning valve mechanisms, respectively, showing a "close-close", "close-open", "open-open", and "open-close", the first designated position represented by a spring-biased cage, and the second by a magnetized float member.
Figure 1A:
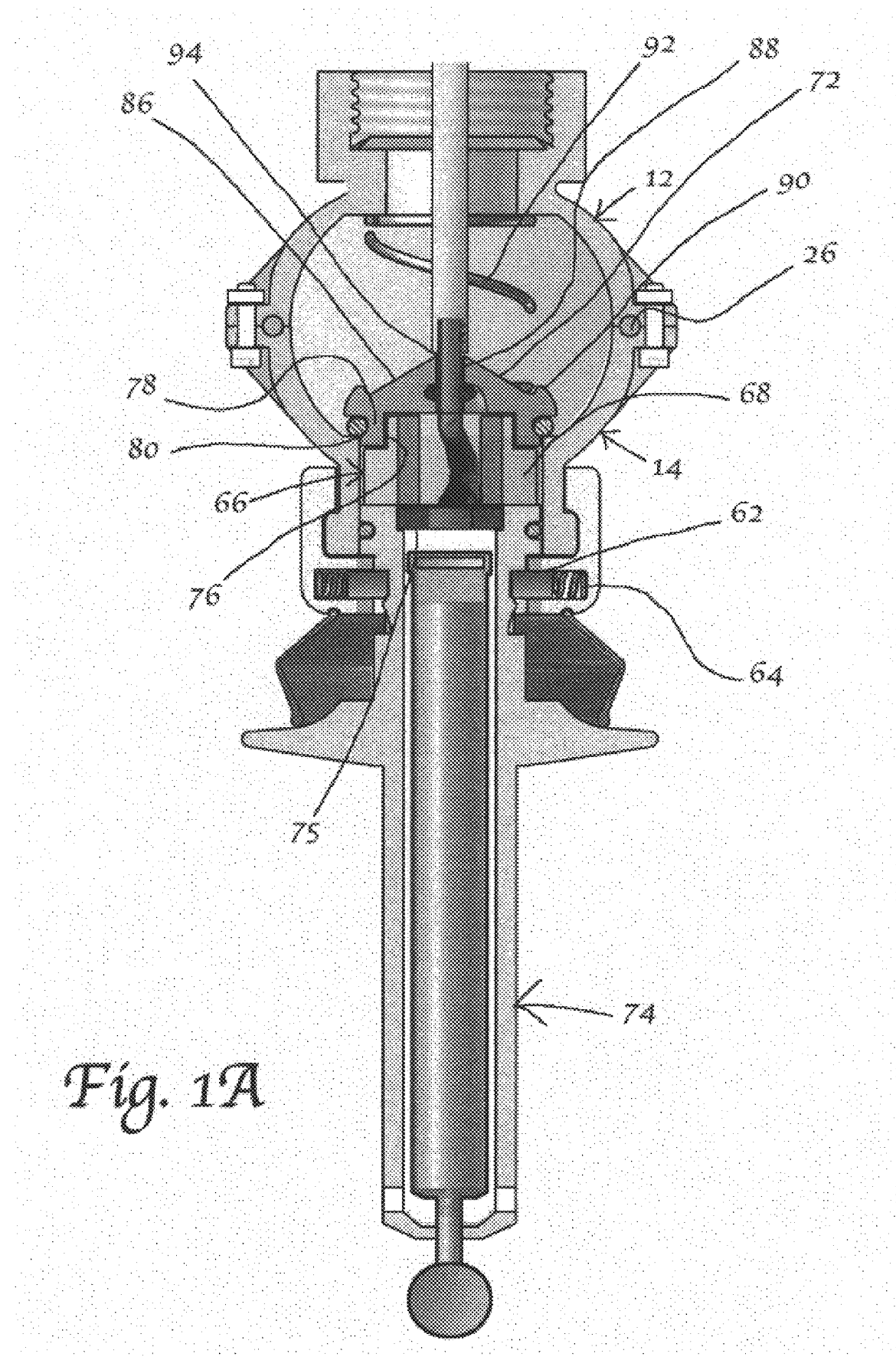

The present invention is directed to a safety valve assembly, such for use in combination with a portable container, where the valve assembly incorporates dual sealing members that must be manually and separately disengaged to effect dispensing of fluid from the container. Further, before overfilling a receptacle, such as a vehicular gas tank with fuel, one of the sealing members automatically closes to avoid spillage. The valve assembly will now be described with regard to the several Figures, where like reference numerals represent like components or features throughout the various views.

Figure 2:
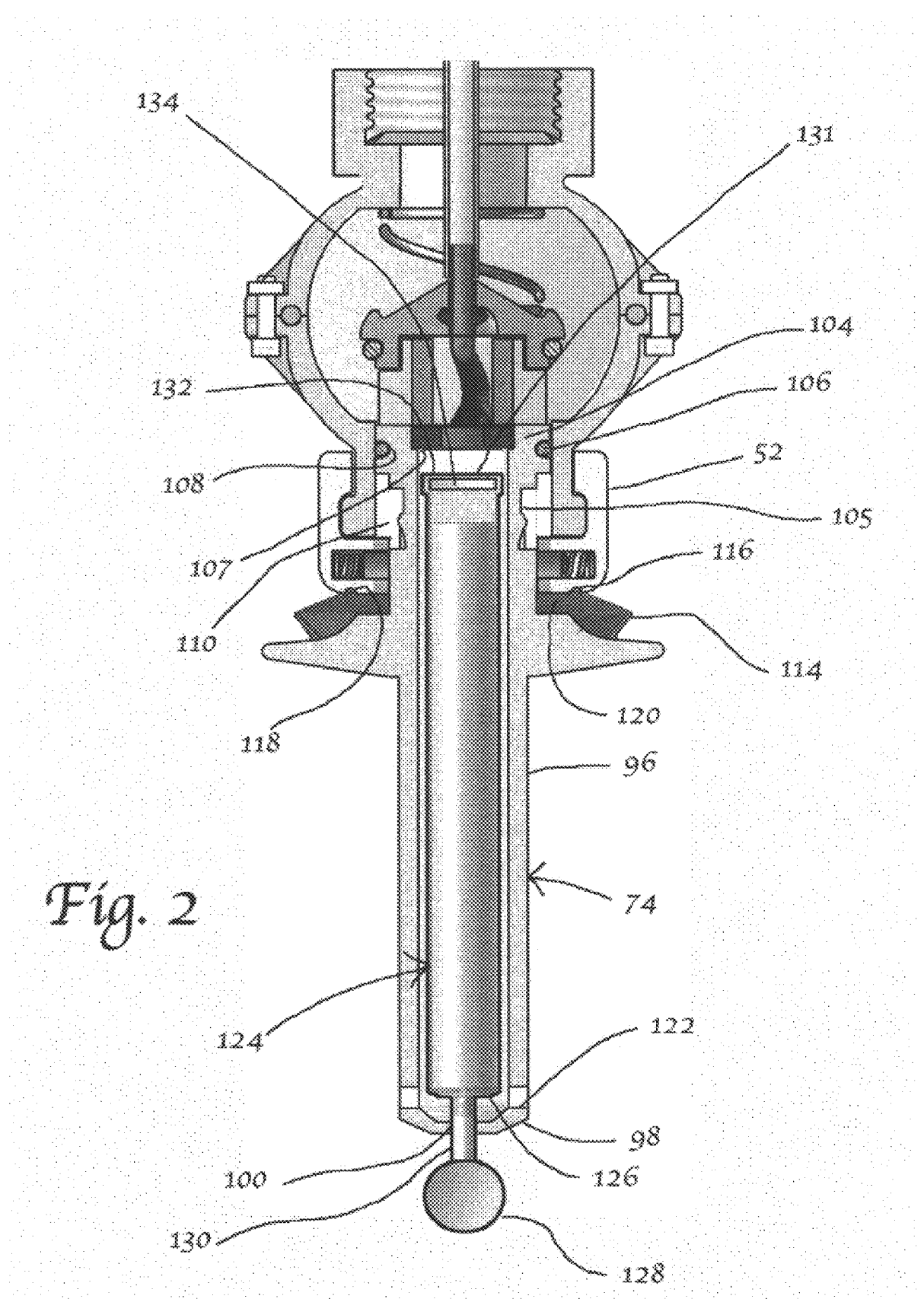
Figure 2A:
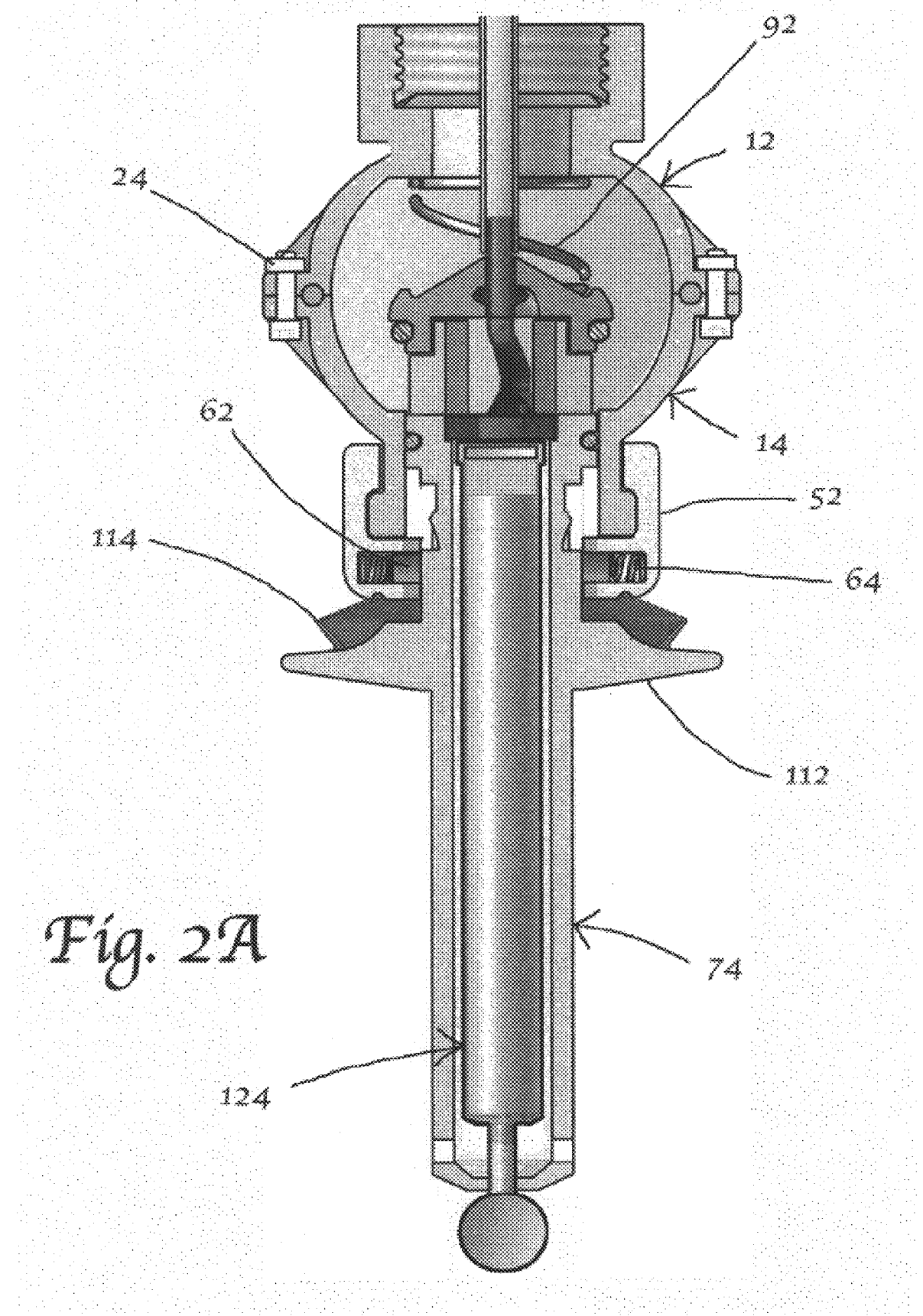
Figure 3:
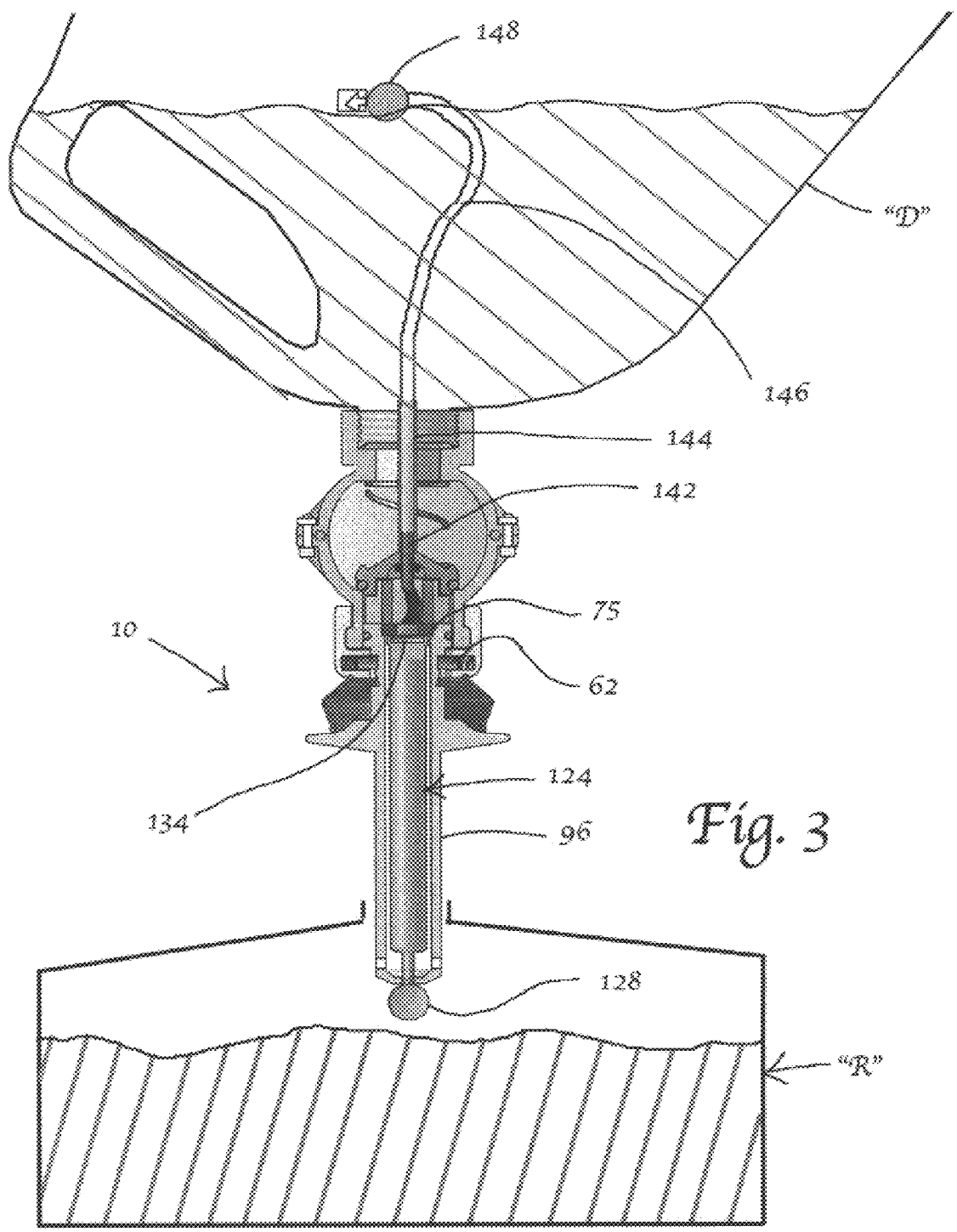
FIG. 3 is a reduced sectional view of the valve assembly for the operating mode of FIG. 1, further showing the valve assembly attached to an exemplary dispensing container after completion of the dispensing process into a receiving receptacle.
Figure 4:
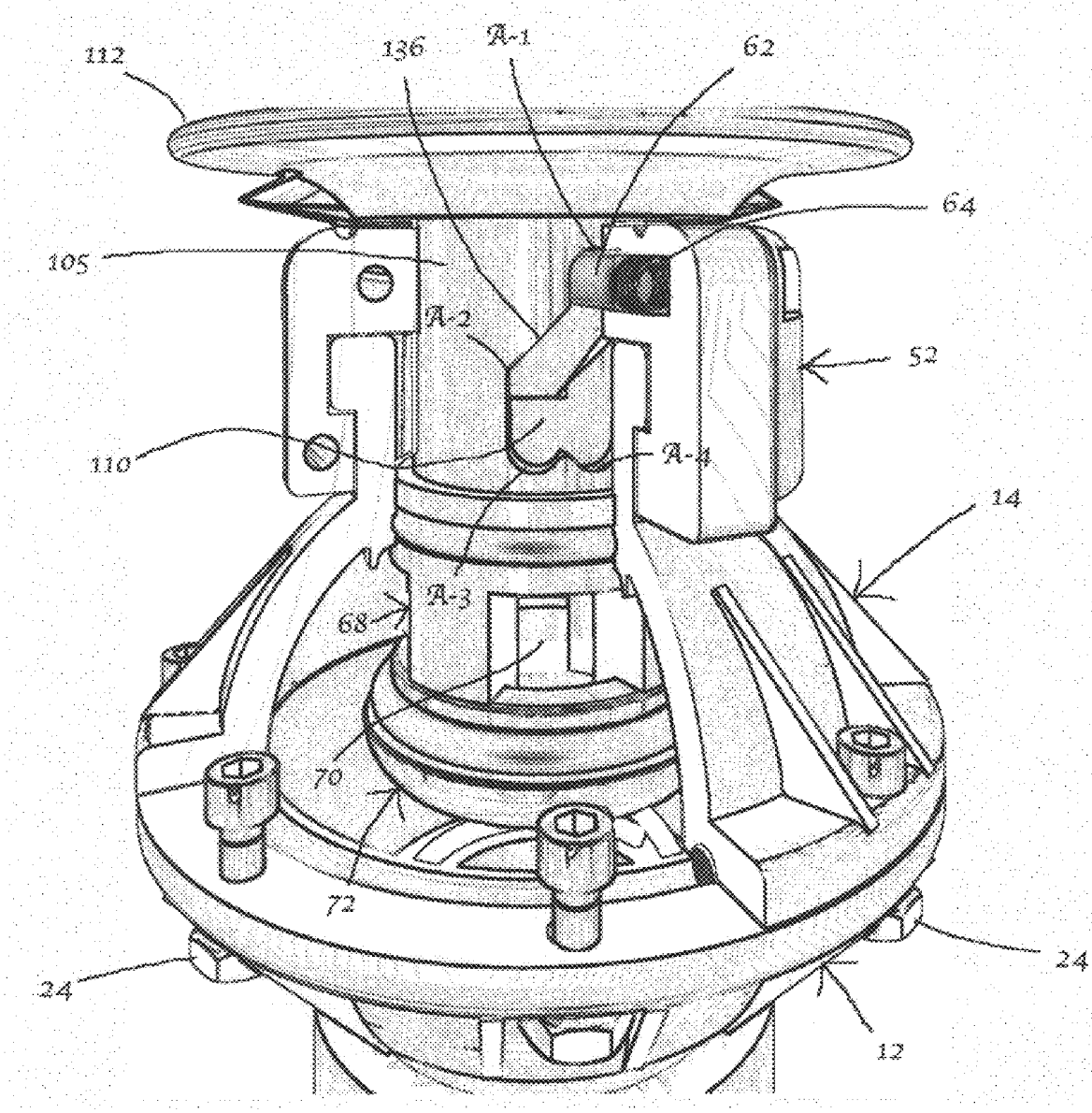
Figure 5:
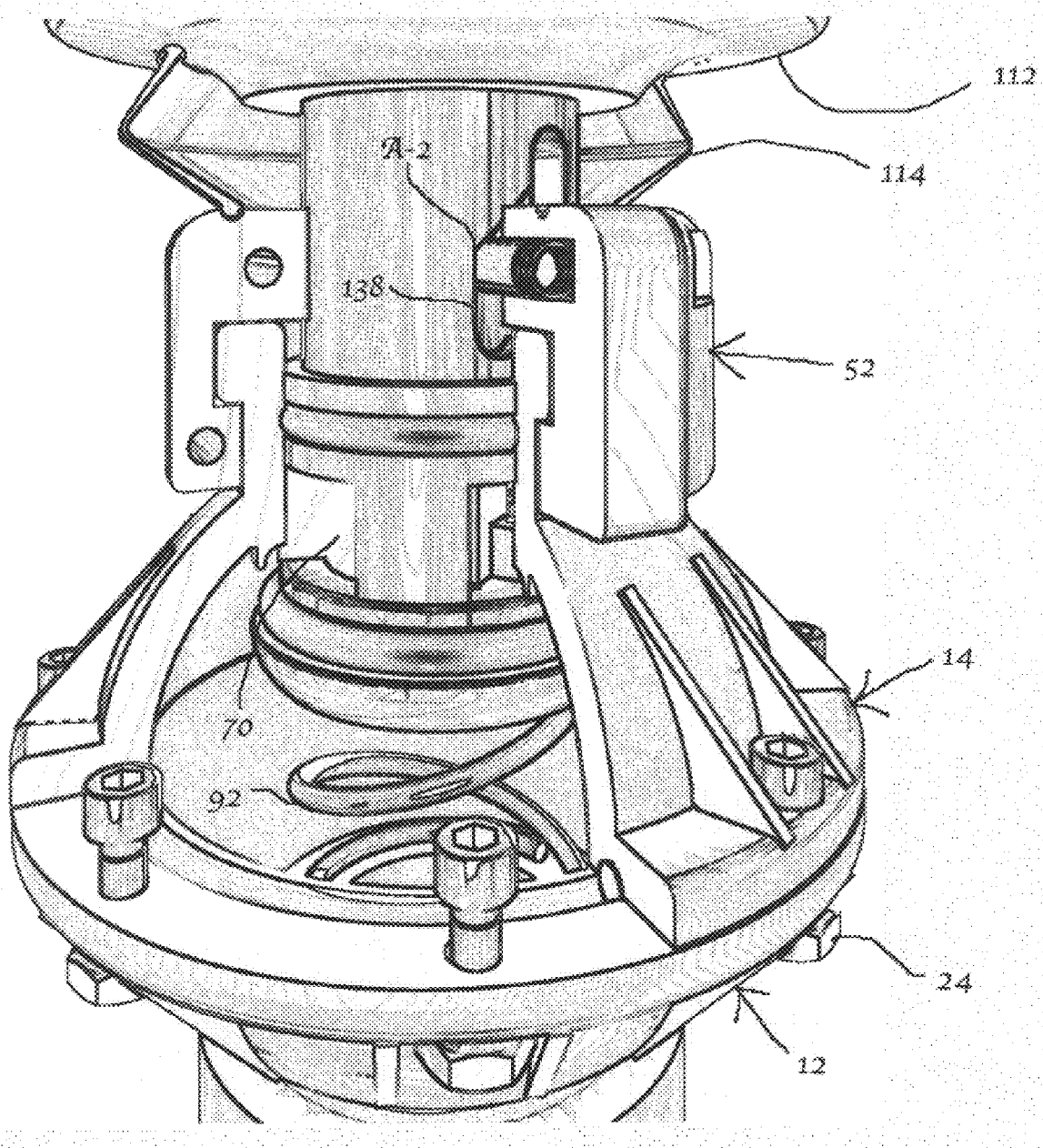

Turning first to FIGS. 1, 1A, 2, 2A and 3, the valve assembly 10 of this invention is shown in different operating modes, where the valve assembly 10 is shown threadably secured to a dispensing container "D" in FIG. 3, and a preferred use of the valve assembly is for the dispensing of a fuel, such as gasoline, from a portable container "D" to the fuel tank or receptacle "R" of a motorized vehicle.

The valve assembly 10 comprises a pair of clam-like, hemispherical housing sections 12, 14, (only one-half being shown) where said housings sections, about the respective peripheral edges 16, 18, include annular mating flanges 20, 22 and plural complementary fastening members 24 to secure the respective housing sections together to form an integral unit. Additionally, a continuous O-ring 26, seated within annular grooves 28, 30, is provided to ensure a sealed integral housing unit. The upper housing section 12 includes a first opening 32 defined by a reduced circular portion 34 with an inner flat face 36, and a second wider circular section 38 having internal threads 40 for threadably engaging a complementary threaded snout 42 on the container "D". The lower half housing section 14 includes a circular extension 44 having a uniform circular I.D. 46, where the distal end 48 includes an external annular flange 50, the function of which will be apparent hereafter.

Overriding the annular flange 50 is a circular cap member 52, where the cap member features an inturned, internal flanged portion 54 that partially wraps around said annular flange 50 in contact with the outer wall of extension 44. The opposite 56 includes a central circular opening 58 defined by an internal flanged portion 60. Mounted within and extending inwardly are plural pins 62 biased by springs 64, where the purpose thereof will be discussed later.

For sliding movement within the circular extension 44, along the I.D 46, is a three part valve mechanism 66, see also FIGS. 4 through 7. The valve mechanism 66 comprises a vertically movable, circular cage 68 that features a discontinuous wall having plural, peripheral fluid openings 70 (FIG. 4), a circular cap 72, and an elongated, generally hollow tubular member 74.

A first end of the circular cage 68 includes an annular recessed portion 76 to receive the circular cap 72, and may be internally recessed 73 for receiving a circular, ring magnet 75, the purpose of which will become apparent hereafter. The circular cap 72 features an annular flanged portion 78 that includes a circular groove 80 to receive a sealing O-ring 82 that further cooperates with a circular groove 84 at the distal end 48 of the housing section 14. The top 86 of cap 72 is essentially domed with a central opening 88 and an intermediate annular groove 90 for seating a compression spring 92, where the spring 92 is in an extended state between the groove 90 and inner flat face 36, see FIG. 3. Finally, the cap 72 may include an O-ring 94 that seals about the central opening 88, as later discussed.

The hollow tubular member 74 includes a hollow body portion 96 having an end 98 with a reduced opening 100. The opposite end 102 of the body portion includes a continuous annular portion 104 that mounts a sealing O-ring 106 within an annular groove 108. Further, internally of the annular portion 104 the body portion may include an annular recess 107 to fully or partially receive the circular magnet 75. Returning now to the annular portion 104, the outer wall 105, as best seen in FIGS. 4 through 7, includes a configured recess 110, where the configuration and function will become apparent hereafter.

The body portion 96 may include an outwardly extending annular stop 112 that limits the depth of penetration of the valve assembly 10 into the receiving receptacle "R", see FIG. 3. Extending between the annular stop 112 and circular cap 52 is a collapsible bellows member 114, where the bellows member may include an annular rib 116 for seating within an annular groove 118 along the surface 120 of the circular cap 84. Finally, the body portion 96 includes plural fluid flow, wall openings 122 in close proximity to the end 98.

Mounted for floating movement with the hollow body portion 98 is a manually activated, vertically movable, elongated float member 124, the second of the separately activated valve mechanisms. Extending from a first end 126 thereof is a knob 128 mounted or a shaft 130 extending through the opening 100. As will be later explained, the knob 128 is sized to be easily gripped by the user to initiate the fluid transfer process. The opposite end 131 of the float member 124 may include a circular recess 132 for receiving a magnet or magnetizable metal 134 for attraction to and contact with magnet 75.

Turning now to FIGS. 4 through 7 which, as noted previously, are oriented opposite to the valve assembly 10 of FIGS. 1, 1A, 2, 2A and 3, the annular portion 104, about its outer wall 105 includes the configured recess 110 that includes plural pin 62 positions, see respectively and sequentially FIGS. 4 through 7. Since a feature of this invention is to ensure a non-spillage system, it is essential that the valve assembly 10 remain closed until such time as one desires to dispense the fluid contained thereby. Accordingly, until the valve assembly 10 is properly rotated, the valve assembly will not dispense the fluid. The configured recess 110 includes a position "A-1" (FIG. 4 and corresponding to the "open-open" position of FIG. 1) for spring biased pin 62 that represents the position for full discharge of the fluid. Leading from this position is an angled slot 136, the end of which defines pin position "A-2" (FIGS. 5 and 1A), and a vertical slot 138 leading to a third pin position "A-3", where the valve assembly is locked. Adjacent the latter location, over the bump 140 is pin position "A-4" (FIGS. 7 and 2A), the valve assembly is locked until manually disengaged. In the position the valve assembly may be stored or transported without concern for spillage, etc. That is, until the valve assembly is rotated, such as twisting or rotating the annular stop 112, to release the spring biased pins from positions "A-4" to "A-3", where the pins can now ride along slots 138 and 136 to reach pin position "A-1", the valve assembly will not function. As the pins 62 traverse the configured recess 110, sequentially from pin position "A-4" to "A-1", the circular cage 68 moves into the open interior of the assembled housing sections 12, 14, thereby exposing the cage openings 70 to the flow of fluid from the dispensing container "D".

Before reviewing the procedure for operating the valve assembly of this invention, reference is made to FIG. 8 where it will be seen that the circular cage 68 further includes an air relief conduit 141 from the free end 142 and at the opposite end an air return line 143, shown in dotted lines, where the former extends up through the cap central opening 88 of the cap top 86, and the latter ids an air return line intake and transfer. The free end 142 may include a fixed conduit 144 and a flexible conduit 146 terminating in a float member 148, where the float includes an opening in communication with the flexible conduit to allow for the release of air.

Turning now to the operation of the valve assembly 10, secured as discussed above to a dispensing container "D", the valve assembly is inserted into a receptacle "R", such as a gas tank, where the fuel is at a low level. However, before inserting the valve assembly, specifically the hollow body portion 96 into the gas tank, the float member 124, such as by the knob 128, is manually pulled to release the float member 124 from the circular ring magnet 75. It is not until the valve assembly is rotated that allows the circular cage to move vertically, as discussed above, and flow of the fluid, i.e. fuel flow, is initiated. As the valve assembly is rotated, the spring biased pins 62 move from pin position "A-4" over the bump 140, like a cam follower, to pin position "A-3". Even at this position, the valve assembly 10 is not open. However, through the weight of the dipensing container "D" the pins 62 are caused to move from position "A-3" through "A-2" and eventually to pin position "A-1" (FIG. 2). As the fluid, i.e. fuel, flows into the receptacle "R", i.e.gas tank, the gas level begins to rise. The rising fuel in turn acts to raise the float member 124, weighted to respond to the density of the fuel, to bring the magnet or magnetizable metal 134 into contact with the magnet 75, thus shutting off the flow of fuel. Thereafter, the valve assembly 10 is counter rotated to the pin position of "A-4" (FIGS. 3 and 7). With the valve assembly returned to its locked and nondispensing position, it, along with the dispensing container "D", may be lifted from the receptacle "R" and stored or transported, as desired.

It is recognized that variations, changes and modifications, particularly by those skilled in the art, may be made to the valve assembly of this invention without departing from the spirit and scope thereof Accordingly, no limitation is intended to be imposed thereon except as set forth in the accompanying claims.

What is claimed is:

1. In combination with a fluid dispensing container for transferring a predetermined quantity of fluid to a receptacle, where said receptacle has a capacity greater than said predetermined quantity, a nonoverflow valve assembly mounted on said fluid dispensing container, where the fluid dispensing is operable only after the release of first and second fluid sealing members in said assembly, said valve assembly comprising:

a through housing having first and second openings, where a first said opening includes means for securing said valve assembly to said dispensing container, and said second opening slidably mounts a generally hollow cylindrical member through which said dispensing fluid is discharged from said container, said hollow cylindrical member including a circular cap mounting a first sealing ring member at a first end for cooperating with said through housing to effect a fluid seal therebetween, a second sealing member disposed in proximity to said first sealing ring member, and an axially movable float member within said cylindrical member, where said float member at a first end extends through said cylindrical member and mounts a disk member, and said second end mounts a magnetizable member for cooperating with said second sealing member to effect a fluid seal therebetween, whereby said valve assembly is rendered operable by manually moving said float member by the application of force to said disk member to disengage said magnetizable member from said second sealing member, followed by the application of axial pressure against said cylindrical member to disengage said first sealing ring member from its engagement with said through housing.

2. The combination according to claim 1, wherein said through housing comprises a central cavity having a circular shoulder at its junction with said first opening, a compression spring extending between said shoulder and said circular cap, where said circular cap includes an annular groove receiving said first sealing ring member, and a complementary flange about said second opening at the junction with said cavity, where said flange includes a curved surface to receive said first sealing ring member in a non-fluid dispensing mode.

3. The combination according to claim 2, wherein said hollow cylindrical member further includes an outwardly extending flange intermediate its length, where axial pressure to move said cylindrical member is effected against said outwardly extending flange.

4. The combination according to claim 3, wherein said second opening of said housing is defined by an annular wall having a uniform inner wall terminating at a free end in an external flange element, where said hollow cylindrical member is movable along said inner wall from a first non-dispensing position to a second dispensing position.

5. The combination according to claim 4, including an encircling housing overriding said external flange element into sliding contact with said hollow cylindrical member.

6. The combination according to claim 5, wherein said encircling housing includes a plurality of spring biased pins acting against said hollow cylindrical member.

7. The combination according to claim 5, including a flexible bellows member between said outwardly extending flange and said encircling housing.

8. The combination according to claim 2, wherein said fluid sealing member comprises a magnetizable ring having a central opening therein, where said magnetizable ring cooperates with said first end of said float member to effect a fluid seal therebetween.

9. The combination according to claim 8, wherein said magnetizable ring includes a second opening offset from said central opening, and a tubular member extending from said second opening up through said circular cap to provide an air relief during the discharging of said fluid from said container.

10. The combination according to claim 2, wherein said through housing is formed by a pair of clam-like housing sections, said sections including opposing mating flanges, and including fastening members for removably securing said sections into an integral unit.

11. The combination according to claim 10, wherein said mating flanges include annular grooves for receiving an O-ring to further effect sealing therebetween.

12. The combination according to claim 1, wherein said cylindrical member has a uniform central cavity of a first diameter, and said float member has a diameter less than said first diameter.

13. The combination according to claim 12, wherein said float member comprises a sealed tube.

14. The combination according to claim 1, wherein said receptacle includes a fluid receiving opening, and said hollow cylindrical member has a diameter of a size to be received in said fluid receiving said opening.

15. The combination according to claim 1, including a rotatable locking mechanism to prevent premature spillage of fluid from said fluid dispensing container.

* * * * *